United States Patent [19]
Kato et al.

[11] Patent Number: 4,970,618
[45] Date of Patent: Nov. 13, 1990

[54] DISK CARTRIDGE CASE FORMED BY ULTRASONIC WELDING

[75] Inventors: Yoshitake Kato, Ibaraki; Minoru Fujita, Toride, both of Japan

[73] Assignee: Hitachi Maxell, Ltd., Osaka, Japan

[21] Appl. No.: 243,836

[22] Filed: Sep. 13, 1988

[30] Foreign Application Priority Data

Sep. 14, 1987 [JP] Japan .................................. 62-228530

[51] Int. Cl.$^5$ ............................................. G11B 23/03
[52] U.S. Cl. .................................................... 360/133
[58] Field of Search ................ 360/133, 132; 242/199; 369/291

[56] References Cited

U.S. PATENT DOCUMENTS 4,482,929 11/1984 Beck et al. ........................... 360/133
4,510,546 4/1985 Asami et al. ......................... 360/133

Primary Examiner—Robert S. Tupper
Attorney, Agent, or Firm—Birch, Stewart, Kolasch & Birch

[57] ABSTRACT

A disk cartridge has a pair of cases, one of the cases including boss portions each having a welding allowance at a top end thereof, the boss portions being projected from one of the cases, the other of the cases being provided with cylindrical portions into which the boss portions are respectively inserted when the cases are superposed, and the welding allowances of the boss portions and inner bottom portions of the cylindrical portions are supersonically-welded to each other, the disk cartridge further including portions for controlling the air flow which includes resin particles generated at the time of the supersonic welding in such a manner that the air flow is directed to that outside of a region in which a disk rotates, the controlling portions being situated adjacent to the welded portions of the cases, thereby avoiding fear of resin particles being adhered to the disk surfaces during ultrasonic welding.

10 Claims, 7 Drawing Sheets

DISK CARTRIDGE CASE FORMED BY ULTRASONIC WELDING

BACKGROUND OF THE INVENTION

This invention relates to a disk cartridge such as a magnetic disk cartridge, an optical disk cartridge or magneto-optical disk cartridge, and, more particularly, to a disk cartridge whose upper case and lower case are ultrasonically welded to each other.

Figure 9:
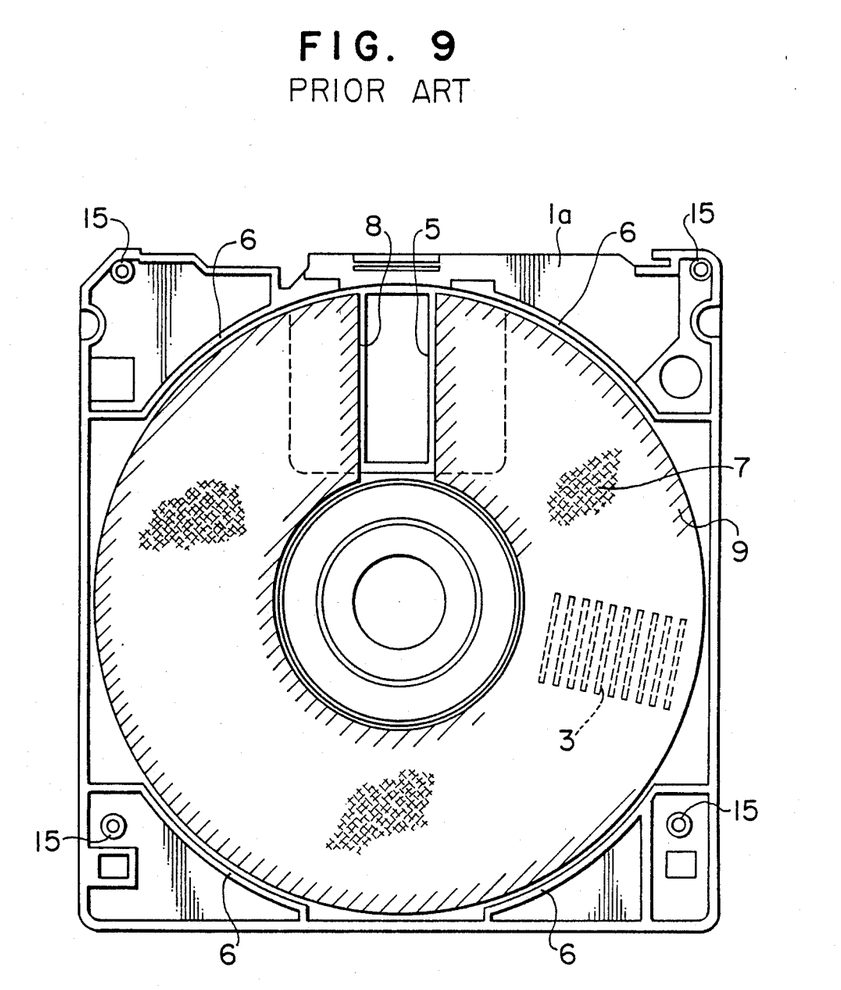
FIG. 9 is a bottom view of an upper case with a cleaning sheet attached thereto.
Figure 10:
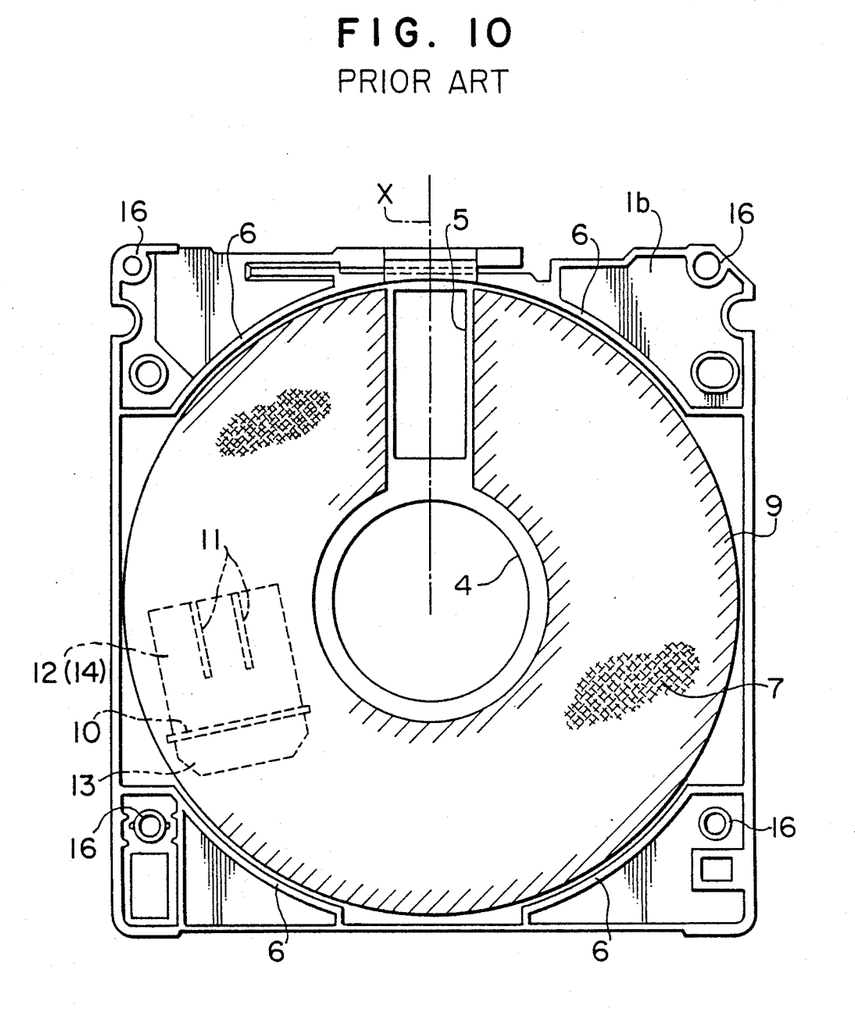
FIG. 10 is a top plan view of a lower case with a cleaning sheet attached thereto.
Figure 11:
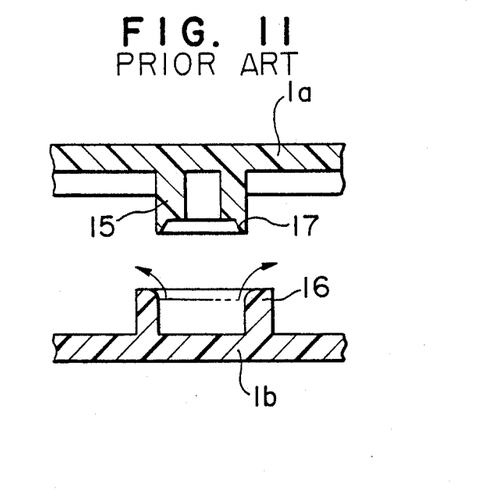
FIG. 11 is a partial cross-sectional view illustrating bonding between a boss and a cylindrical portion.
Figure 12:
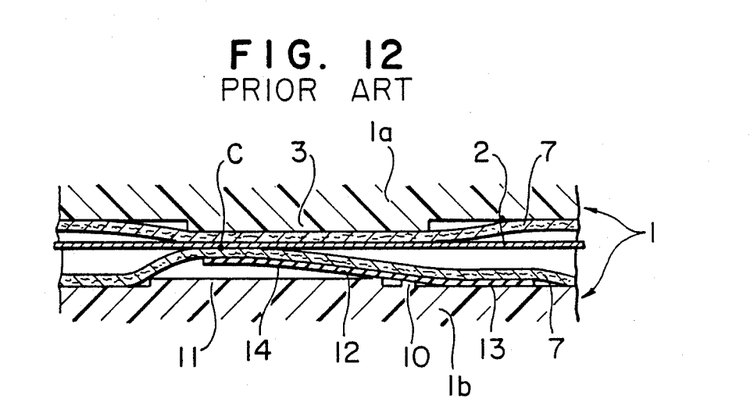
FIG. 12 is a cross-sectional view of a resilient member and parts adjacent thereto.

FIG. 9 is a bottom view of an upper case with a cleaning sheet attached thereto in a conventional magnetic disk cartridge. FIG. 10 is a top plan view of a lower case with the cleaning sheet attached thereto in the magnetic disk cartridge. FIG. 11 is an enlarged cross-sectional view illustrating a state where the upper and lower cases of the magnetic disk cartridge are subjected to ultrasonic welding. FIG. 12 is an enlarged cross-sectional view of a resilient member disposed in the magnetic disk cartridge.

The magnetic disk cartridge mainly comprises a cartridge case 1, a magnetic disk 2 (see FIG. 12) accommodated rotatably therein, and a shutter (not shown) supported slidably by the cartridge case 1 and adapted to open and close head insertion ports or apertures 5.

The cartridge case 1 comprises an upper case 1a and a lower case 1b which are formed of a hard synthetic resin, such as an ABS resin. As shown in FIG. 10, an opening 4 in which a rotating and driving shaft is inserted is formed substantially in the center of the lower case 1b, and the head insertion port 5 having a rectangular shape is provided in the vicinity thereof. The upper case 1a is similarly provided with the head insertion port 5 (see FIG. 9).

A plurality of protrusions 3 arranged in parallel at predetermined positions and arcuate restricting ribs 6 for restricting the accommodation position of the magnetic disk 2 are provided on an inner surface of the upper case 1a. A cleaning sheet 7 made of, for instance, a non-woven fabric formed of a mixture of rayon fibers and polyester fibers, is placed in the space surrounded by the restraining ribs 6. Since the cleaning sheet 7 is thus placed, the protrusions 3 are covered with the cleaning sheet 7, and the peripheral portion of the cleaning sheet 7 is heat-bonded to the upper case 1a at a portion 9 by means of ultrasonic welding or a similar method.

As shown in FIGS. 10 and 12, a protruding support 10 and adhesion preventing protrusions 11 are provided on the inner surface of the lower case 1b and at a position substantially opposing the protrusions 3 of the upper case 1a. In addition, a proximal end portion 13 of a resilient member 12 formed by bending a plastic sheet into the form of a chevron is secured to the inner surface of the lower case 1b in the vicinity of the support 10 by a suitable means, such as bonding or welding. The distal end portion of the resilient member 12 is provided with an inclined portion 14 which projects in such a manner as to be inclined relative to the lower case 1b.

The lower case 1b is also provided with the restricting ribs 6 in the same way as the upper case 1a, and the cleaning sheet 7 is placed on the inner side thereof. Since the cleaning sheet 7 is thus placed, the resilient member 12 is covered, and most of the peripheral portion of the cleaning sheet 7 is welded or heat-bonded to the lower case 1b at the portion 9. However, a portion of the peripheral portion of the cleaning sheet 7 opposed to the opposite side ends of the resilient member 12 is not heat-bonded.

As shown in FIG. 9, bosses 15 are provided in the vicinity of the four corners of the upper case 1a, and, as shown in FIG. 10, cylindrical portions 16 into which the bosses 15 are inserted are provided in the vicinity of the four corners of the lower case 1b, respectively. As shown in FIG. 11, a portion 17 of allowance for welding is formed at the tip portion of each of the bosses 15, and the bosses 15 are respectively inserted into the cylindrical portions 16 with the portions 17 of allowance for fusion facing downward. Subsequently, as ultrasonic energy is supplied to the contacting portions of the boss 15 and the cylindrical portion 16, the portions of allowance 17 for fusion are melted, and the tip portions of the bosses 15 are thereby bonded to the inner bottom surfaces of the cylindrical portions 16.

If the disk cartridge is assembled by thus bonding together the upper case 1a and the lower case 1b as a unit, the cleaning sheet 7 on the side of the lower case 1b is partially lifted by the inclined portion 14 of the resilient member 12, as shown in FIG. 12, while a part of the cleaning sheet 7 in the upper case 1a opposed to the lifted portion is slightly pushed downwardly by the protrusions 3 provided on the upper case 1a. Consequently, the magnetic disk 2 is clamped lightly and resiliently by the upper and lower cleaning sheets 7. Then, as the magnetic disk 2 rotates, the surfaces of the disk are cleaned by the cleaning sheets 7.

In cases where the resilient member 12 and the cleaning sheets 7 are used to clean the magnetic disk 2, the portion of the cleaning sheet 7 lifted most highly by the resilient member (inclined portion 14), i.e., point C in FIG. 12, has the largest cleaning effect, and this point C (which is a straight line in a plane parallel to the disk 2) is referred to as the cleaning position in this specification or description.

As shown in FIG. 10, in a conventional disk cartridge, the aforementioned resilient member 12 and the like are disposed in such a manner that this cleaning point C is located in the range of from 90 to 120 degrees upstream of a center line X of the head insertion port 5 in the rotating direction of the disk.

In the conventional disk cartridge, when the boss portion 15 is, as shown in FIG. 11, inserted into the cylindrical portion 16, and the two members are welded by ultrasonic energy, an air flow including resin particles is generated by vibrations. The air is, as designated by an arrow in FIG. 11, introduced into the cartridge case 1 via an opening of the cylindrical portion 16. As a result, parts of the resin particles are allowed to adhere to the surface of the magnetic disk 2, causing errors at the time of recording and/or reproduction.

An object of the present invention is to provide a disk cartridge which can overcome the above-described problem and which has an enhanced reliability without the occurrence of errors due to adhesion of the resin particles to the surface of the magnetic disk.

SUMMARY OF THE INVENTION

In order to achieve the above-described object, in accordance with the present invention, a disk cartridge is formed in such a manner that boss portions, each having a welding allowance at the top end thereof, are projected from the surface of one of the cases thereof, while another case is provided with cylindrical portions into which the boss portions are respectively inserted, the two cases being interposed with the boss portions inserted into the cylindrical portions, and the welding allowances of the boss portions and the inner bottom portions of the cylindrical portions ultrasonically-welded to each other. The disk cartridge comprises portions for controlling or restricting air flow which would include resin particles generated at the time of the ultrasonic welding in such a manner that the air flow is not directed to a region in which a disk rotates, the controlling or restricting portions which may be a rib, a wall around a slit-like groove or the like being disposed adjacent to the welding allowance portions of the case(s).

BRIEF DESCRIPTION OF THE DRAWINGS

FIGS. 1 to 8 illustrate a magnetic disk cartridge in accordance with an embodiment of the present invention, in which

FIGS. 9 to 12 are diagrams illustrating a conventional disk cartridge, in which

DESCRIPTION OF THE PREFERRED EMBODIMENT

Referring now to FIGS. 1 to 8 a description will be given of an embodiment of the present invention.

A magnetic disk cartridge in accordance with this embodiment differs from a conventional magnetic disk cartridge, shown in FIGS. 9 to 12, in that the configuration of the cylindrical portions 16 formed in the lower case 1b and the place of installation of a resilient member 12 and protrusions 3.

First, a description will be given of the configuration of the cylindrical portions 16. As shown in FIG. 3, the cylindrical portions 16 disposed on both sides of a front portion (upper side as viewed in FIG. 2) of the lower case 1b are respectively provided with arcuate ribs 18 each disposed on the cylindrical portion 16 and having an opening angle of about 100 degrees or more toward the side opposed to an area where a magnetic disk 2 rotates.

Figure 6:
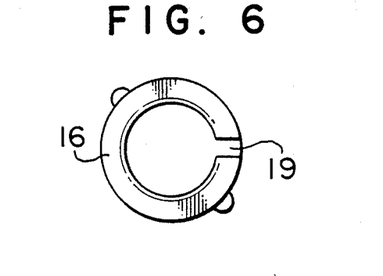
FIG. 6 is an enlarged top plan view of a cylindrical portion provided in a rear portion of the lower case.

Meanwhile, as shown in FIG. 6, each of the cylindrical portions 16 disposed on both sides of a rear portion (lower side as viewed in FIG. 2) of the lower case 1b is provided with a slit 19 in a peripheral wall thereof on the side facing away from the rotating area of the disk, the slit 19 being provided down to the vicinity of the foot of the peripheral wall.

Figure 4:
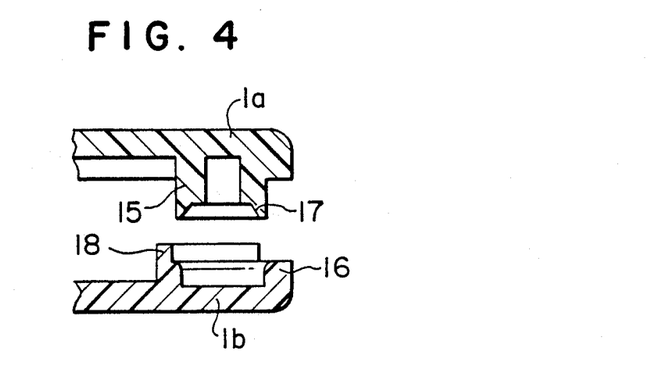
FIGS. 4 and 5 are partial cross-sectional views illustrating bonding between the cylindrical portion and a boss.
Figure 5:
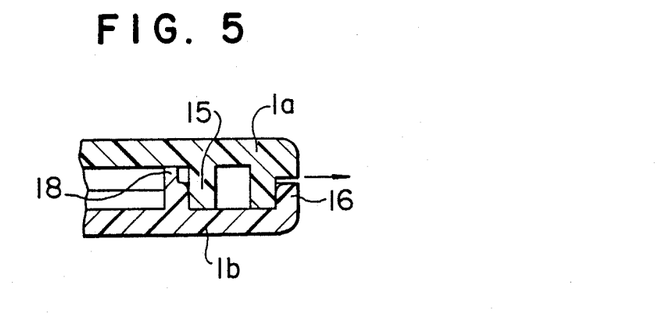
Figure 7:
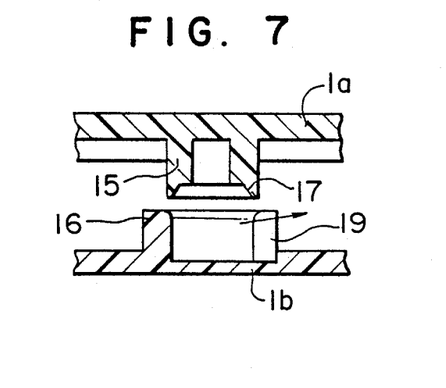
FIG. 7 is a partial cross-sectional view illustrating the cylindrical portion and a boss.

As shown in FIGS. 4 and 7, an annular portion 17 of allowance for fusion is formed at a tip portion of each boss 15 of the upper case 1a. When the cases 1a and 1b are bonded together, the front bosses 15 are respectively inserted into the corresponding front cylindrical portions 16, as showing FIG. 4, and ultrasonic energy is supplied between the boss 15 and the cylindrical portion 16 to effect bonding. At this time, however, since the upper surface of the arcuate rib 18 is brought into contact with the inner surface of the upper case 1a, as shown in FIG. 5, the air containing fine particles of resin does not flow in the direction of the rotating area of the disk, but flows to the opposite side to the rotating area of the disk, as shown by the arrow.

In addition, as shown in FIG. 7, the rear boss 15 is inserted into the corresponding rear cylindrical portion 16, and ultrasonic energy is supplied between the boss 15 and the cylindrical portion 16 to effect bonding. At that time, the flowing direction of the air containing fine particles of resin is restricted to flow through the slit 19 in such manner as to be directed to the side opposite to the rotating area of the disk, as shown by the arrow in the drawing.

Refering now to FIGS. 1, 2 and 8, a description will now be given of the places of installation of the resilient member 12 and protrusions 3.

Figure 2:
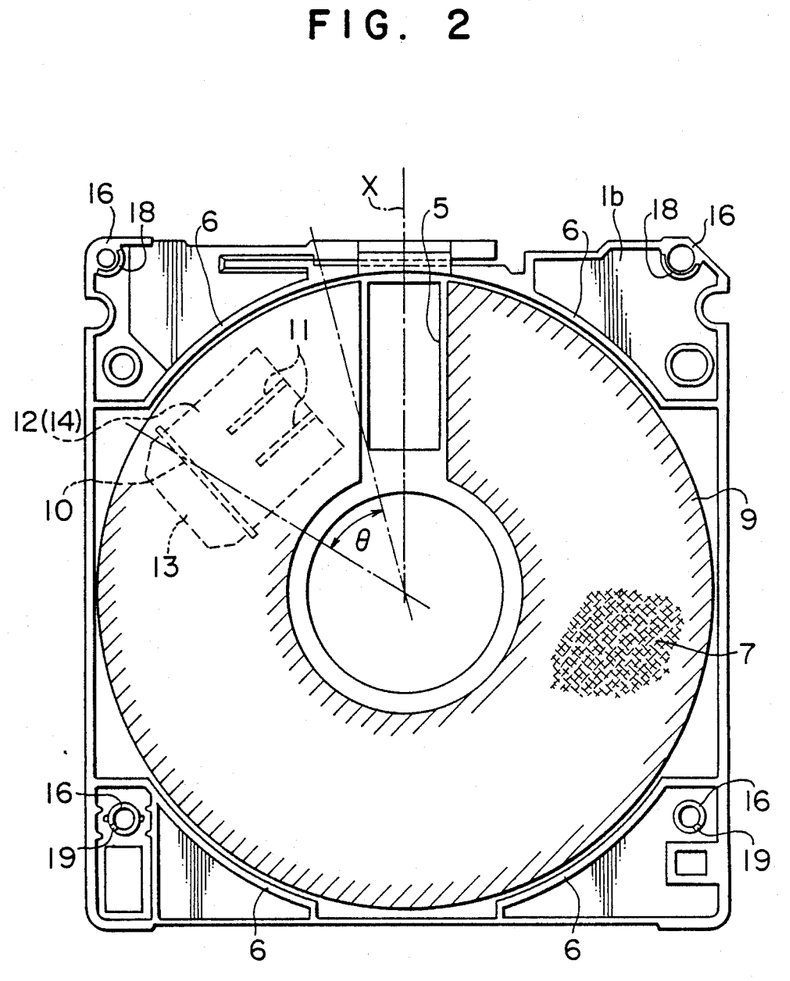
FIG. 2 is a top plan view of a lower case with a cleaning sheet attached thereto.
Figure 3:
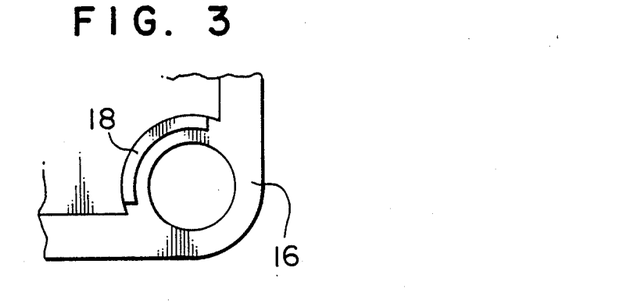
FIG. 3 is an enlarged, plan view of a cylindrical portion provided in a front portion of the lower case.

As shown in FIG. 2, a plurality of protrusions 11 each having a protruding length of 12.5 mm, and a protruding support 10 having a protruding length of 20 mm extending in a direction perpendicular to the protrusions 11 are provided on the inner surface of the lower case 1b in the vicinity of the head insertion aperture or port 5. In addition, the resilient member 12 formed by bending a plastic sheet made of a polyester sheet with a thickness of 12.5 $\mu$m into the shape of a chevron is secured to be resiliently extended at a region above the support 10 and the protrusions 11, as in the case of a conventional apparatus. A portion of a cleaning sheet 9, which is formed of a non-waven fabric, such as rayon fibers or polyester fibers, and having a thickness of about 300 $\mu$m and which extends from the vicinity of the resilient member 12 to its edge, opposed to the head insertion port 5, is not secured by heat bonding and is left free. For this resilient member 12, a sponge body, a metallic sheet, or the like may be used instead cf a plastic sheet.

Figure 1:
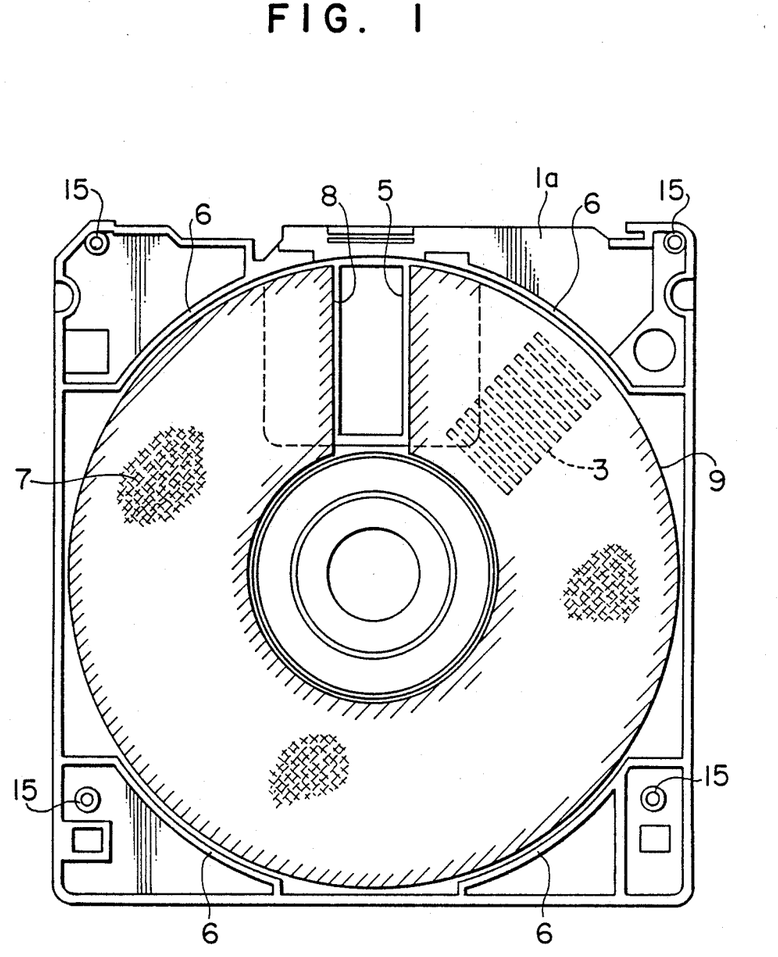
FIG. 1 is a bottom view of an upper case with a cleaning sheet attached thereto.

In addition, as shown in FIG. 1, a plurality of protrusions 3 each having a height of about 0.4 mm are provided on the inner surface of the upper case 1a at a position opposed to the resilient member 12, i.e., in the vicinity of the head insertion port 5.

Figure 8:
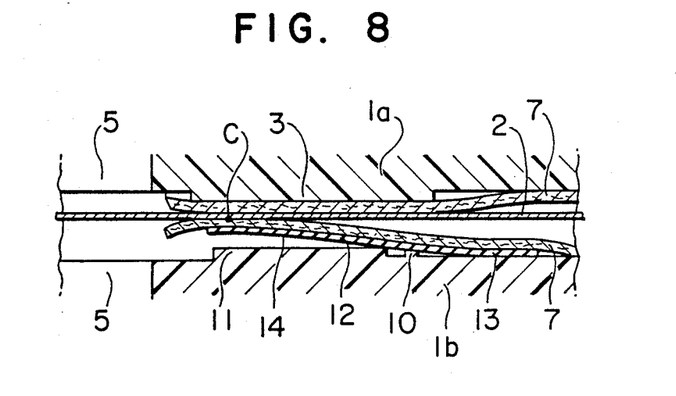
FIG. 8 is an enlarged cross-sectional view of a resilient member and parts adjacent thereto.

Accordingly, if the upper case 1a and the lower case 1b are bonded together to assemble a magnetic disk cartridge, the cleaning sheet 7 on the side of the lower case 1b is partially raised by the inclined portion 14 of the resilient member 12, as shown in FIG. 8. At the same time, the raised portion is slightly pushed downwardly by the protrusions 3 on the side the upper case 1a. As a result, the magnetic disk 2 is lightly and resiliently clamped by the upper and lower cleaning sheets 7, 7. As illustrated in FIG. 8, the edge portion of the cleaning sheet 7 on the side of the lower case 1b, which is opposed to the head insertion port 5, is not fixed to the lower case 1b and is set free, as described above.

Even if the edge portion of the cleaning sheet 7 is thus set free, since the rotating direction of the magnetic disk 2 is always the same, the edge portion of the cleaning sheet 7 does not get turned up.

The cleaning position C of the disk cartridge in accordance with this embodiment is located within 60 degrees upstream of the central axis A of the head insertion port 5 in the rotating direction of the disk, as shown in FIG. 2. It would be preferable to bring the cleaning position C as close as possible to the head insertion port 5 since the probability of having cleaned the portion of the magnetic disk 2 opposed to the magnetic head becomes high before the disk cartridge is inserted in the recording and reproducing apparatus and the magnetic head comes into contact with the magnetic disk 2. However, if a part of the resilient member 12 projects from the head insertion port 5, it will undesirably serve as a hindrance at the time of recording and reproduction, so that it is necessary to bring the resilient member 12 close to the head insertion port 5 to the extent that it does not project therefrom. Hence, it suffices if the cleaning position C is designed to fall within the range of the angle θ, as show in FIG. 2.

In the above-described embodiment, although the structures are changed between the front portion and the rear portion in such a manner that the ribs 18 in the form of a circular arc are provided in the front cylindrical portions 16, while the groove portions 19 are provided in the rear cylindrical portion 16, all of the cylindrical portions 16 may be provided with the ribs 18 in the form of a circular arm or the groove portions 19.

Although in the above-described embodiment, the boss portions 15 are provided on the upper case 1a, while the cylindrical portions 16 are provided on the lower case 1b, the contrary manner can be employed, that is, the cylindrical portions 16 may be formed on the upper case 1a, while the boss portions 15 may be provided on the lower case 1b.

Furthermore, in the foregoing embodiment, while the description has been given of the case of a magnetic disk cartridge, the present invention is also applicable to an optical disk cartridge, a magneto-optical disk cartridge, or other types of disk cartridge.

Since the present invention is structured as described above, resin particles generated at the time of performing ultrasonic welding can be prevented from adhering to the disk surface. As a result of this, a disk cartridge capable of operating reliably can be provided.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A disk cartridge comprising a pair of generally rectangular cases, one of said cases including at least two boss portions situated near both corners at a front portion thereof and projected from a principal plane thereof, each of said boss portions having a welding allowance at a top end thereof, the other of said cases being provided with two hollow cylindrical portions at a corresponding front portion thereof into which said boss portions are respectively inserted when said cases are superposed to form said cartridge including therein a region in which a disk rotates, said welding allowances of said boss portions and inner bottom portions of said cylindrical portions being ultrasonically-welded to each other, and at least two flow-direction-control members one each provided at each associated cylindrical portion for controlling air flow which includes air containing resin particles generated at the time of the ultrasonic welding in such a manner that said air flow is directed to a region outside of the region in which the disk rotates.

2. A disk cartridge according to claim 1, wherein each of said flow-direction control members comprises a rib in the form of a circular arc situated on an upper portion of each of said cylindrical portions on a side confronting the region in which said disk is rotated, and a top surface of each of said ribs in the form of said circular arc is in contact with an inner surface of said one case having the corresponding boss portions.

3. A disk cartridge according to claim 1, wherein each of said flow-direction control members comprises a circular member having a slit formed in said cylindrical member on a side thereof opposite said region in which said disk is rotated.

4. A disk cartridge according to claim 1, wherein said cartridge further includes positioning ribs for positioning a magnetic disk within said cartridge, said positioning ribs projecting from on inner surface of each of said cases, and wherein said boss portions and said cylindrical portions are situated between outer walls of said respective cases and said positioning ribs.

5. A disk cartridge according to claim 1, wherein one of said cases includes a boss portion situated at each corner at both front and rear portions thereof, and including an associated flow-direction-control member at each corner of said front portion on the other of said cases formed as an arcuate rib confronting the region in which the disk rotates, and an associate flow-direction-control member at each corner of said rear portion of said other case formed as a cylindrical member each provided with a slit in a peripheral wall thereof on a side thereof facing away from the region in which the disk rotates.

6. A disk cartridge according to claim 1, wherein said cases are made from an ABS resin.

7. A disk cartridge comprising a pair of generally rectangular cases, one of said cases including at least two boss portions situated near both corners at a front portion thereof and projected from a principal plane thereof, each of said boss portions having a welding allowance at a top end thereof, the other of said cases being provided with two hollow cylindrical portions at a corresponding front portion thereof into which said boss portions are respectively inserted when said cases are superposed to form said cartridge including therein a region in which a disk rotates, said welding allowances of said boss portions and inner bottom portions of said cylindrical portions being ultrasonically-welded to each other, and at least two flow-direction-control members one each provided at each associated cylindrical portion for controlling air flow, which includes air containing resin particles generated at the time of the ultrasonic welding, in such a manner that said air flow is directed to a region outside of the region in which the disk rotates, each of said flow-direction control members comprising a rib in the form of a circular arc situated on an upper portion of each of said cylindrical portions on a side confronting the region in which said disk is rotated, and a top surface of each of said ribs in the form of said circular arc is in contact with an inner surface of said one case having the corresponding boss portions.

8. A disk cartridge comprising a pair of generally rectangular cases, one of said cases including at least two boss portions situated near both corners at a front portion thereof and projected from a principal plane thereof, each of said boss portions having a welding allowance at a top end thereof, the other of said cases being provided with two hollow cylindrical portions at corresponding corners of said front portion thereof into which said boss portions are respectively inserted when said cases are superposed to form said cartridge including therein a region in which a disk rotates, said welding allowances of said boss portions and inner bottom portions of said cylindrical portions being ultrasonically-welded to each other, and at least two flow-direction-control members one each provided at each associated cylindrical portion for controlling air flow, which includes air containing resin particles generated at the time of the ultrasonic welding, in such a manner that said air flow is directed to a region outside of the region in which the disk rotates, each of said flow-direction control members comprising a circular member having a slit formed in said cylindrical member on a side thereof opposite said region in which said disk is rotated.

9. A disk cartridge comprising a pair of generally rectangular cases, one of said cases including two boss portions situated near both corners at a front portion thereof and two boss portions situated near both corners at a rear portion thereof, each of said boss portions being projected from a principal plane thereof, each of said boss portions having a welding allowance at a top end thereof, the other of said cases being provided with hollow cylindrical portions at corresponding corners of said front and rear portions thereof into which said boss portions are respectively inserted when said cases are superposed to form said cartridge including therein a region in which a disk rotates, said welding allowances of said boss portions and inner bottom portions of said cylindrical portions being ultrasonically-welded to each other, and flow-direction-control members one each provided at each associated cylindrical portion for controlling air flow, which includes air containing resin particles generated at the time of the ultrasonic welding, in such a manner that said air flow is directed to a region outside of the region in which the disk rotates, including a corresponding flow-direction-control member at each corner of said front portion formed as an arcuate rib directing air flow away from the region in which the disk rotates, and a corresponding flow-direction-control member at each corner of said rear portion formed as a cylindrical member each provided with a slit in a peripheral wall thereof on a side thereof facing away from the region in which the disk rotates.

10. A disk cartridge according to claim 9, wherein said cartridge further includes positioning ribs for positioning a magnetic disk within said cartridge, said positioning ribs projecting from an inner surface of each of said cases, and wherein said boss portions and said cylindrical portions are situated between outer walls of said respective cases and said positioning ribs.

* * * * *